(12) United States Patent
Effenberger

(10) Patent No.: US 8,538,271 B2
(45) Date of Patent: Sep. 17, 2013

(54) COMBINED BURST MODE LEVEL AND CLOCK RECOVERY

(75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 656 days.

(21) Appl. No.: 12/623,722

(22) Filed: Nov. 23, 2009

(65) Prior Publication Data

US 2011/0008055 A1 Jan. 13, 2011

Related U.S. Application Data

(60) Provisional application No. 61/223,770, filed on Jul. 8, 209.

(51) Int. Cl.
*H04B 17/00* (2006.01)

(52) U.S. Cl.
USPC ........... 398/155; 398/202; 398/203; 398/204; 398/205; 398/206; 398/207; 398/208; 398/209; 398/210; 398/211; 398/212; 398/213; 398/214; 375/360

(58) Field of Classification Search
USPC .......................... 375/360; 398/155, 202–214
See application file for complete search history.

(56) References Cited

U.S. PATENT DOCUMENTS

2003/0116696 A1* 6/2003 Hoshide .................... 250/214 A
2007/0064848 A1 3/2007 Desai

* cited by examiner

*Primary Examiner* — Danny Leung
(74) *Attorney, Agent, or Firm* — Conley Rose, P.C.; Grant Rodolph; John H. Scott, III

(57) ABSTRACT

An apparatus comprising an optical receiver configured to receive an optical signal, and a combined level and clock recovery circuit coupled to the optical receiver and configured to update a signal threshold and a clock phase substantially simultaneously. Also included is an apparatus comprising at least one processor configured to implement a method comprising recognizing reception of a signal, and adjusting a threshold and a clock phase associated with the signal using a rising time for the signal and a falling time for the signal. Also included is a method comprising receiving a signal, and adjusting a threshold level of the signal to establish level recovery using a clock recovery scheme.

15 Claims, 4 Drawing Sheets

COMBINED BURST MODE LEVEL AND CLOCK RECOVERY

CROSS-REFERENCE TO RELATED APPLICATIONS

The present application claims priority to U.S. Provisional Patent Application No. 61/223,770 filed Jul. 8, 2009 by Frank Effenberger and entitled "Combined Burst Mode Level and Clock Recovery," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Burst mode reception is one of the issues that is addressed in optical networks that use time division multiple access (TDMA), such as in some passive optical networks (PONs). In such networks, the receivers can receive incoming digital signal bursts at varying and hence unknown signal levels (unknown zero and one bit levels) and unknown clock phase. The varying signal levels and clock phase can be caused by the signal modulation schemes and/or any distortion of the signal passing through an optical fiber, e.g. due to fiber dispersion and polarization mode dispersion (PMD). The unknown signal levels and clock phase of the incoming signals need to be accounted for proper reception. A variety of "level recovery" techniques have been proposed to account for the unknown levels of the signals. The level recovery techniques convert the amplitudes and offsets of the received signals to controlled binary amplitude signals, e.g. by determining a signal threshold level that separates a zero bit from a one bit. For example, the threshold can be obtained by averaging the signal over a period of time, detecting the peak values of the signal, and then finding the mean value between the peaks, or by other means. However, such detection schemes are substantially analog techniques, and as such, are prone to errors and do not account for the unknown clock phase in the signals. In addition, a variety of "clock recovery" techniques are proposed to account for the unknown clock phase in the signals. Typically, in PONs the frequency of an incoming burst signal is known, but its phase is unknown. Therefore, many techniques are proposed to phase align the receiver's local clock to the incoming burst signal's clock phase. Such techniques include using phase-locked loops, time over-sample, and/or parallel delay line processing. However, such schemes do not address the unknown levels of the signals and assume that the clock recovery circuit is receiving a proper digital signal, e.g. comprising proper and distinguishable zero bit and one bit levels.

SUMMARY

In a first embodiment, the disclosure includes an apparatus comprising an optical receiver configured to receive an optical signal, and a combined level and clock recovery circuit coupled to the optical receiver and configured to update a signal threshold and a clock phase substantially simultaneously.

In a second embodiment, the disclosure includes an apparatus comprising at least one processor configured to implement a method comprising recognizing reception of a signal, and adjusting a threshold and a clock phase associated with the signal using a rising time for the signal and a falling time for the signal.

In a third embodiment, the disclosure includes a method comprising receiving a signal, and adjusting a threshold level of the signal to establish level recovery using a clock recovery scheme.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for combined level and clock recovery for burst mode signals, which may have unknown signal levels and clock phase. The burst mode signals may be optical signals that exhibit an eye pattern. The eye pattern may comprise a rising transition portion and a falling transition portion, which may be used to determine an ideal threshold for level recovery and an ideal clock time for clock recovery. To account for the unknown signal levels, a signal threshold may be adjusted to the ideal threshold, which may be equal to about the signal level at the intersection between the rising transition portion and the falling transition portion. The unknown signal levels, e.g. zero bit and one bit levels, may then be determined based on the ideal threshold. Additionally, to account for the unknown signal clock phase, a local clock time may be adjusted to the ideal clock time, which may be at about the time of the intersection between the rising transition portion and the falling transition portion. The unknown signal clock phase may be determined based on the ideal clock time. As such, level recovery and clock recovery of the burst mode signal may be achieved substantially simultaneously (e.g. at about the same time) using the same circuitry, which may improve efficiency and reduce cost.

Figure 1:
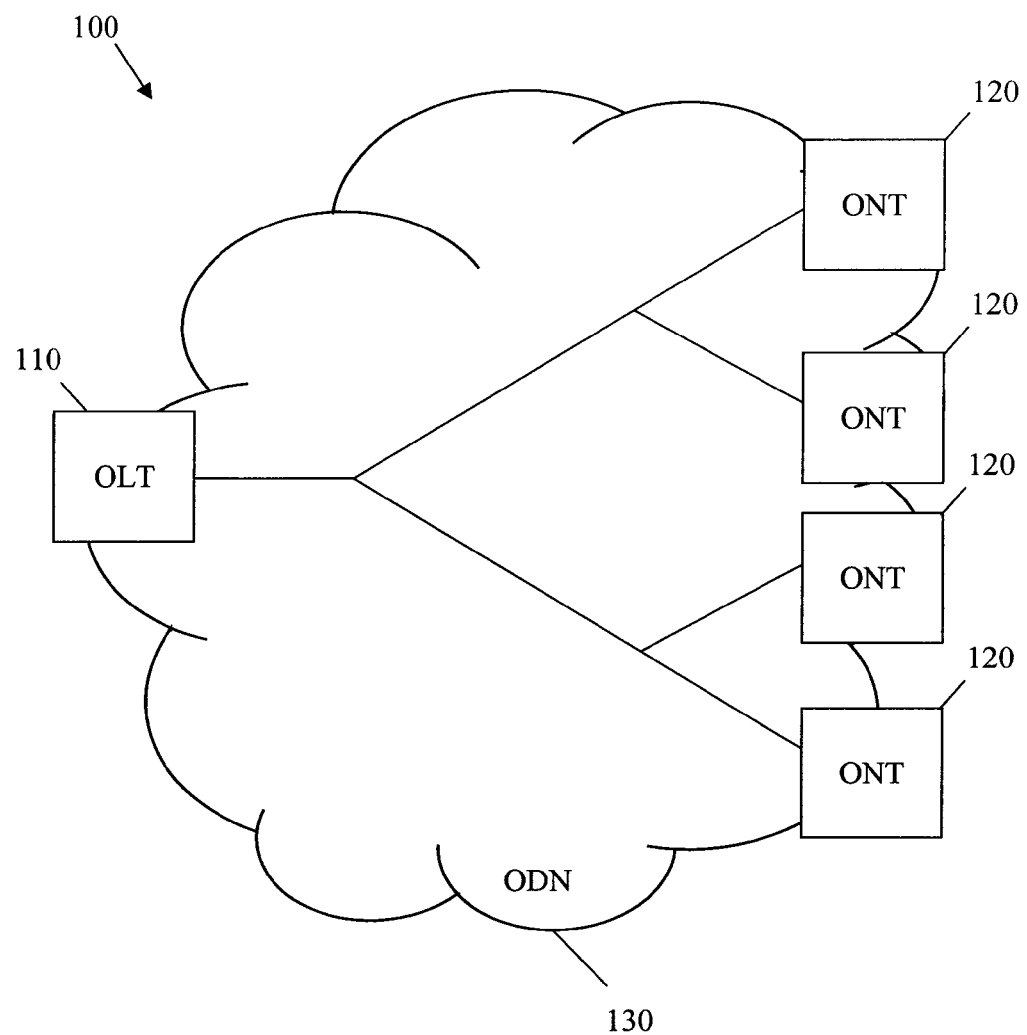
FIG. 1 is a schematic diagram of an embodiment of a PON.

The burst mode signal may be an optical signal transmitted based on a TDMA scheme in an optical network, such as a PON. A PON is one system for providing network access over "the last mile." The PON is a point-to-multipoint network comprised of an optical line terminal (OLT) at the central office, an optical distribution network (ODN), and a plurality of optical network terminals (ONTs) at the customer premises. Data is transmitted in the PON over optical fibers that connect the different PON components. FIG. 1 illustrates one embodiment of a PON 100. The PON 100 comprises an OLT 110, a plurality of ONTs 120, and an ODN 130. The PON 100 is a communications network that does not require any active components to distribute data between the OLT 110 and the ONTs 120. Instead, the PON 100 uses the passive optical components in the ODN 130 to distribute data between the OLT 110 and the ONTs 120. Examples of suitable PONs 100 include the asynchronous transfer mode PON (APON) and the broadband PON (BPON) defined by the International Telecommunication Union Telecommunication Standardization Sector (ITU-T) G.983 standard, the Gigabit PON (GPON) defined by the ITU-T G.984 standard, the Ethernet PON (EPON) defined by the IEEE 802.3ah standard, and the wavelength division multiplexing (WDM) PON (WDM-PON), all of which are incorporated by reference as if reproduced in their entirety.

One component of the PON 100 may be the OLT 110. The OLT 110 may be any device that is configured to communicate with the ONTs 120 and another network (not shown). Specifically, the OLT 110 may act as an intermediary between the other network and the ONTs 120. For instance, the OLT 110 may forward data received from the network to the ONTs 120, and forward data received from the ONTs 120 onto the other network. Although the specific configuration of the OLT 110 may vary depending on the type of PON 100, in an embodiment the OLT 110 may comprise a transmitter and a receiver. When the other network is using a protocol, such as Ethernet or Synchronous Optical Networking/Synchronous Digital Hierarchy (SONET/SDH), that is different from the communications protocol used in the PON 100, the OLT 110 may comprise a converter that converts the other network's data into the PON's protocol. The converter may also convert the PON's data into the other network's protocol. The OLT 110 described herein is typically located at a central location, such as a central office, but may be located at other locations as well.

Another component of the PON 100 may be the ONTs 120. The ONTs 120 may be any device that is configured to communicate with the OLT 110 and a customer or user (not shown). Specifically, the ONTs 120 may act as an intermediary between the OLT 110 and the customer. For instance, the ONTs 120 may forward data received from the OLT 110 to the customer, and forward data received from the customer onto the OLT 110. Although the specific configuration of the ONTs 120 may vary depending on the type of PON 100, in an embodiment the ONTs 120 may comprise an optical transmitter configured to send optical signals to the OLT 110. Additionally, the ONTs 120 may comprise an optical receiver configured to receive optical signals from the OLT 110 and a converter that converts the optical signal into electrical signals for the customer, such as signals in the asynchronous transfer mode (ATM) or Ethernet protocol. The ONTs 120 may also comprise a second transmitter and/or receiver that may send and/or receive the electrical signals to a customer device. In some embodiments, ONTs 120 and optical network units (ONUs) are similar, and thus the terms are used interchangeably herein. The ONTs 120 are typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONTs 120. In some embodiments, the ODN 130 may comprise one or more optical amplifiers. The ODN 130 typically extends from the OLT 110 to the ONTs 120 in a branching configuration as shown in FIG. 1, but may be alternatively configured as determined by a person of ordinary skill in the art.

In an embodiment, the receiver of the OLT 110 and/or ONTs 120 may receive an optical burst mode signal, for instance based on a TDMA scheme, which may have varying and therefore unknown signal (bit) levels and clock phase. The receiver may be coupled to or comprise a clock recovery circuit configured for combined level and clock recovery. The clock recovery circuit may be configured to account for the unknown signal levels and clock phase. The optical burst mode signal may have an eye pattern, which may correspond to a modulated optical signal, e.g. using return-to-zero (RZ), non-return-to-zero (NRZ), or optical duobinary (ODB) modulation formats. The clock recovery circuit may analyze the eye pattern features, as described in detail below, to determine an ideal threshold and clock time for the optical burst signal. The ideal threshold and clock time may be determined substantially simultaneously, e.g. at about the same time, and then used to determine the unknown signal levels and clock phase.

Figure 2:
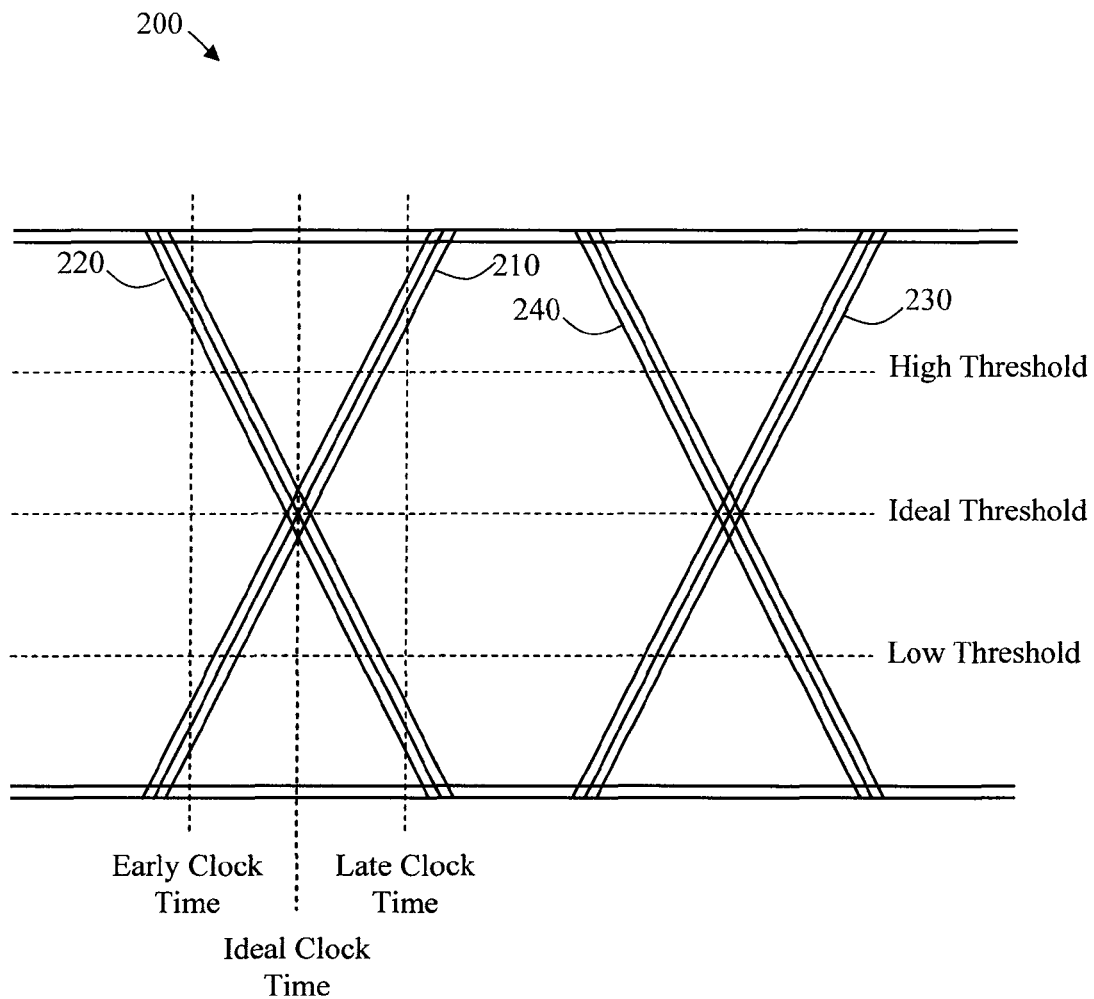
FIG. 2 is a chart of an embodiment of an optical burst mode signal.

FIG. 2 illustrates an embodiment of an optical burst mode signal 200, which may be received by the OLT 110 and/or the ONT 120, for instance using a TDMA scheme. Specifically, FIG. 2 shows an eye pattern diagram of the optical burst mode signal 200. The eye patterns of the optical burst mode signal 200 may comprise a plurality of rising and falling transition portions that may be repeated along a detection time of the signal, including a rising transition portion 210 and a falling transition portion 220. The rising transition portion 210 may correspond to a transition from a lower signal level to a higher signal level, e.g. from a zero bit signal level to a one bit signal level. The falling transition portion 220 may correspond to a transition from a higher signal level to a lower signal level, e.g. from a one bit signal level to a zero bit signal level.

An ideal threshold that may be used for distinguishing between a high or low signal level (e.g. a zero or one bit level) may be located at about the middle of a high and low signal level. For instance, the intersection between the rising transition portion 210 and the falling transition portion 220 may be a suitable point to set the ideal threshold. Since the signal levels may vary with time, the intersection points between the rising transition portions and the falling transition portions of the optical burst mode signal 200 may also vary. For example, the intersection point between a second rising transition portion 230 and a second falling transition portion 240 may not be aligned at the same signal level as the intersection between the rising transition portion 210 and the falling transition portion 220. Therefore, the ideal threshold may change with time, and hence the threshold may require updating over the incoming signal time. A clock recovery circuit that is configured for combined level and clock recovery may be used to update the threshold. The clock recovery circuit may obtain and use the times of the rising transition portion 210 and falling transition portion 220 according to the local clock to update the threshold. The times of the rising transition portion 210 and falling transition portion 220 may be related to the threshold value. For example, if the threshold is a high threshold (relative to the ideal threshold), the rising transition portion 210 may occur later in time than the falling transition portion 220. Alternatively, if the threshold is a low threshold (relative to the ideal threshold), the rising transition portion 210 may occur earlier in time than the falling transition portion 220.

In an embodiment, to adjust the threshold to the ideal threshold or at least to a value that may be closer to the ideal threshold, a threshold level error ("Threshold-Level-Error") may be calculated and then subtracted from the threshold. The threshold level error may be calculated using the local clock time for the rising transition portion 210 ("$T_{rise}-T_{local}$") and the local clock time for the falling transition portion 220 ("$T_{fall}-T_{local}$"), which may be detected by the clock recovery circuit. The threshold level error may be equal to about the difference between the two local clock times, such as Threshold-Level-Error=$(T_{rise}-T_{local})-(T_{fall}-T_{local})$ or Threshold-Level-Error=$T_{rise}-T_{fall}$.

As such, in the case of a high threshold, $(T_{rise}-T_{local})$ may be greater than $(T_{fall}-T_{local})$ and the updated threshold may be less than the high threshold and hence closer to the ideal threshold. Alternatively, in the case of a low threshold, $(T_{rise}-T_{local})$ may be less than $(T_{fall}-T_{local})$ and the updated threshold may be greater than the low threshold and hence closer to the ideal threshold. The process of calculating and using the threshold level error to update the threshold may be repeated along the incoming signal time, and thus the updated threshold may converge to about the ideal threshold over time. For instance, the clock recovery circuit may obtain and use the local clock times of the subsequent rising transition portion 230 and falling transition portion 240 to further update the threshold.

Additionally, the intersection between the rising transition portion 210 and the falling transition portion 220 may determine an ideal clock time for phase aligning the receiver's local clock to the incoming burst signal's clock phase. Determining the signals' clock phase may be required to separate between two subsequently transmitted bits in the signal. The ideal clock time may vary as the signal levels vary with time, and therefore the local clock time (or clock phase) may require updating over the incoming signal time. The same clock recovery circuit that updates the threshold may be used to update the local clock time. The clock recovery circuit may use the same obtained times of the rising transition portion 210 and falling transition portion 220 to update the threshold and the local clock time substantially simultaneously, e.g. at about the same time. The local clock time may be related to the times of the rising and falling transition portions of the optical burst mode signal 200. For example, if the local clock time is an early clock time (relative to the ideal clock time), the rising transition portion 210 may occur earlier in time than the falling transition portion 220. Alternatively, if the local clock time is a late clock time (relative to the ideal clock time), the rising transition portion 210 may occur later in time than the falling transition portion 220.

In an embodiment, to adjust the local clock time to the ideal clock time or at least to a value that may be closer to the ideal clock time, a clock phase error ("Clock-Phase-Error") may be calculated and then added to the local clock time. The clock phase error may be equal to about half the sum between the two local clock times, such as Clock-Phase-Error=$[(T_{rise}-T_{local})+(T_{fall}-T_{local})]/2$ or Clock-Phase-Error=$T_{rise}/2+T_{fall}/2-T_{local}$.

As such, in the case of an early clock time, both $(T_{rise}-T_{local})$ and $(T_{fall}-T_{local})$ will be positive, and the updated local clock time may be greater than the early clock time and hence closer to the ideal clock time. Alternatively, in the case of a late clock time, both $(T_{rise}-T_{local})$ and $(T_{fall}-T_{local})$ will be negative, and the updated local clock time may be less than the late clock time and hence closer to the ideal clock time. The process of calculating and using the clock phase error to update the local clock time may be repeated substantially simultaneously with calculating and using the threshold level error parameter to update the threshold along the incoming signal time. For instance, the clock recovery circuit may use the local clock times of the subsequent rising transition portion 230 and falling transition portion 240 to further update the local clock time. Thus the updated local clock time may converge to about the ideal clock time as the updated threshold converges to about the ideal threshold over time. Such a substantially simultaneous level and clock recovery scheme may be more efficient and less costly than other serial level and clock recovery schemes, e.g. where level recovery and clock recovery are established in sequence and/or using two separate circuits.

In an embodiment, the clock recovery circuit may detect the local clock time for the rising transition portion 210 ("$T_{rise}-T_{local}$") and the local clock time for the falling transition portion 220 ("$T_{fall}-T_{local}$") based on any burst mode clock recovery technique, such as phase-locked loops, time over-sample, parallel delay line processing, or combinations thereof. In some embodiments, the clock recovery circuit may receive an incoming burst mode signal from a level recovery circuit configured for preliminary or coarse signal level recovery. The clock recovery circuit may then further adjust the threshold to the ideal threshold and adjust the local clock time, as described above. To achieve combined level and clock recovery, the local clock times for the signal transition portions may be detected using a digital circuit instead of an analog circuit, which may reduce design complexity. Additionally, since the detected local clock times that are used for combined level and clock recovery may be output signals of the clock recovery circuit, the combined recovery scheme may be more accurate than other open-loop schemes that use intermediate signals.

Figure 3:
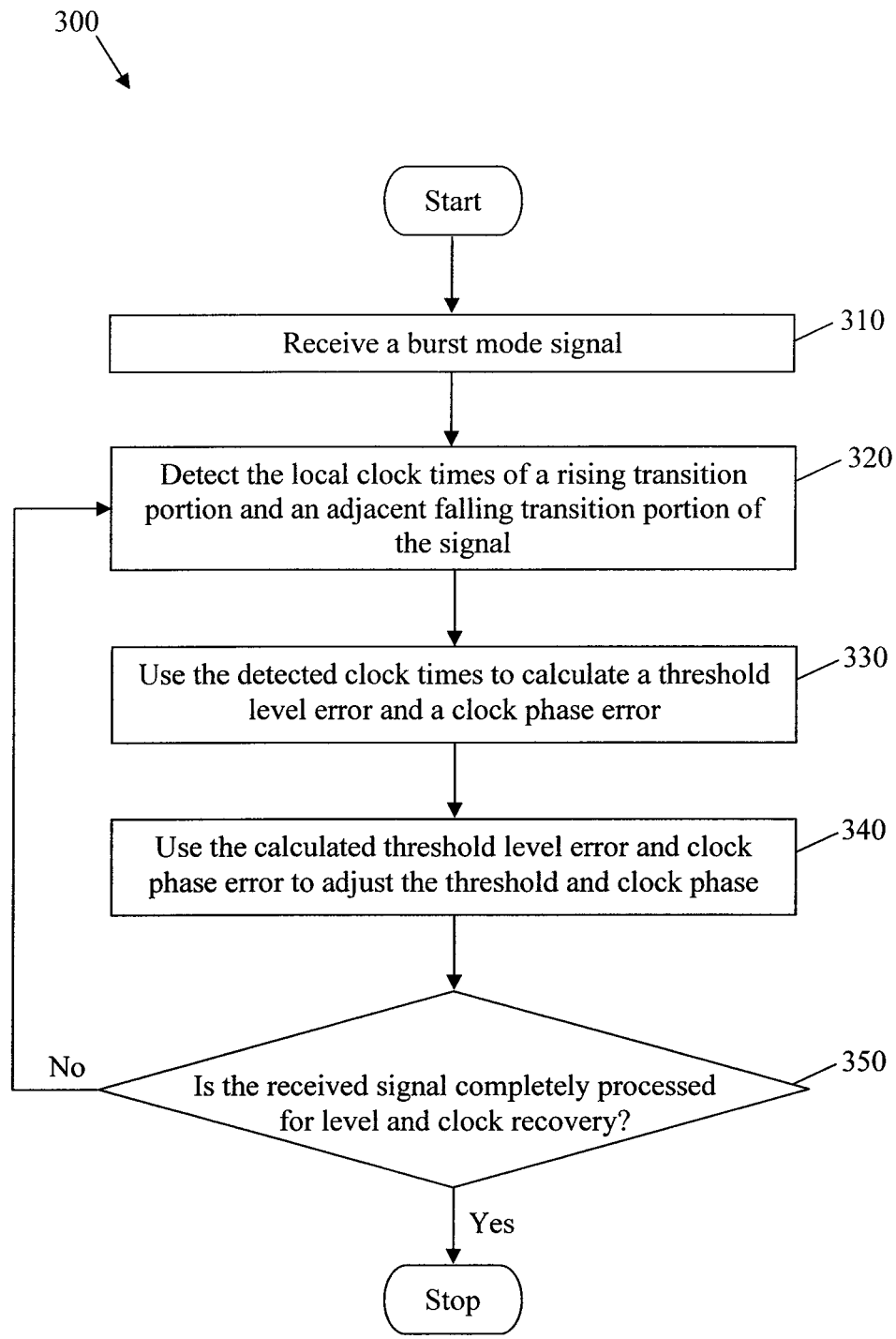
FIG. 3 is a flowchart of an embodiment of a combined level and clock recovery method.

FIG. 3 illustrates one embodiment of a combined level and clock recovery method 300, which may be used to determine the ideal threshold and ideal clock time for a burst mode signal. The burst mode signal may be an optical signal transmitted in an optical network, e.g. the PON 100. The combined level and clock recovery method 300 may begin at block 310, where the burst mode signal may be received, e.g. by a receiver at the OLT 110 or ONT 120. At block 320, the local clock times of a rising transition portion and an adjacent falling transition portion of the signal may be detected. For instance, a digital clock recovery circuit may detect the two clock times according to a local clock associated with the receiver. At block 330, a threshold level error and a clock phase error may be calculated using the detected local clock times, as described above. At block 340, the calculated threshold level error and clock phase error may be used to adjust the threshold and clock phase (e.g. of a local clock). At block 350, the method 300 may determine whether the received signal is completely processed for level and clock recovery. The method 300 may then end if the condition in block 350 is met. Alternatively, if the signal is not completely analyzed, then the method 300 may return to block 320 to detect the local clock times of subsequent rising and falling transition portions in the signal, and hence further adjust the threshold and clock phase. For instance, the threshold and clock phase may be further adjusted using local clock times of subsequent rising and falling transition portions in the signal to improve accuracy.

Figure 4:
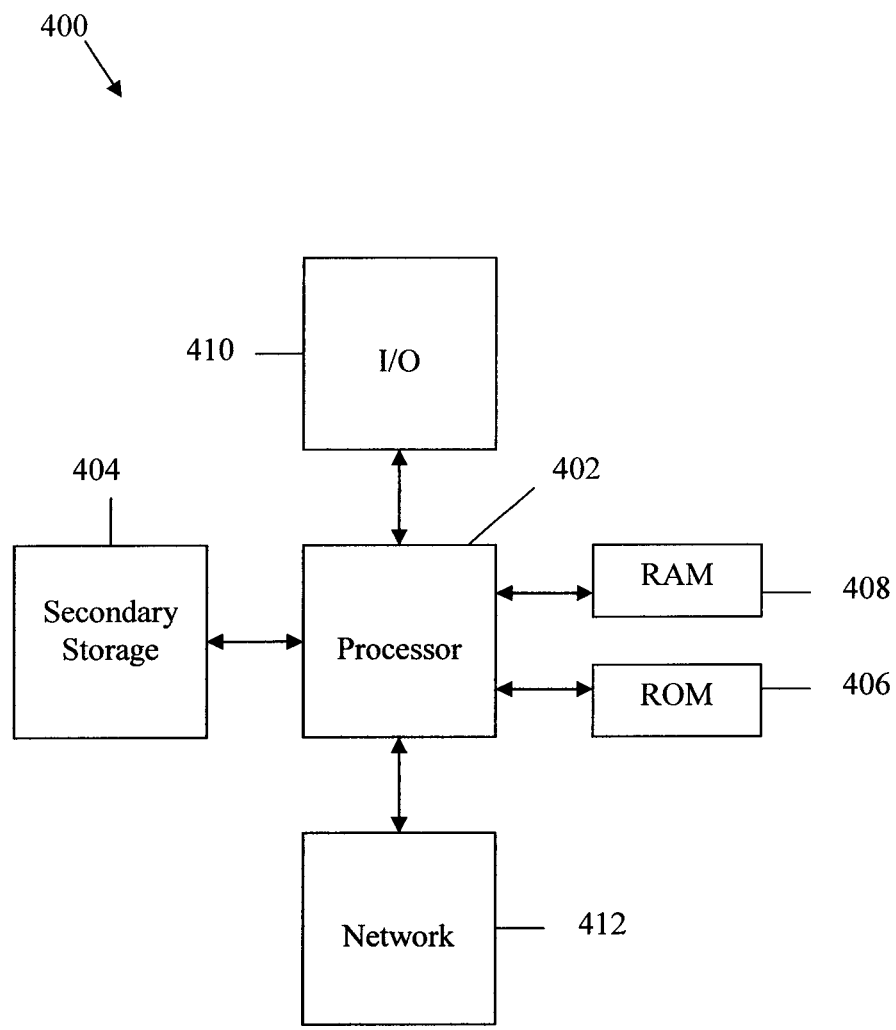
FIG. 4 is a schematic diagram of one embodiment of a general-purpose network component.

The components described above may be operated in conjunction with any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. For instance, the network component 400 may be located at or coupled to the clock recovery circuit configured for combined level recovery and clock recovery. The network component 400 may be used to implement the combined level recovery and clock recovery method 300. The network component 400 may include a processor 402 (which may be referred to as a central processor unit or CPU) that is in communication with any memory devices including secondary storage 404, read only memory (ROM) 406, random access memory (RAM) 408, input/output (I/O) devices 410, and network connectivity devices 412, or combinations thereof. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
an optical receiver configured to receive an optical signal; and
a combined level and clock recovery circuit coupled to the optical receiver and configured to update a signal threshold and a clock phase substantially simultaneously, wherein the signal threshold and clock phase are updated using a signal rising time and a signal falling time, and wherein the signal rising time and the signal falling time are output signals from the combined level and clock recovery circuit.

2. The apparatus of claim 1, wherein the signal threshold is updated to match an ideal threshold at an intersection of a signal rising portion and a signal falling portion.

3. The apparatus of claim 1, wherein the clock phase is updated to match an ideal clock time at the intersection of a signal rising portion and a signal falling portion.

4. The apparatus of claim 1, wherein the combined level and clock recovery circuit is a digital circuit.

5. The apparatus of claim 1, wherein the combined level and clock recovery circuit is coupled to a level recovery circuit and is configured to receive the optical signal from a level recovery circuit, wherein the level recovery circuit is configured for a coarse level recovery of the optical signal and the combined level and clock recovery circuit is configured for a fine level recovery of the optical signal.

6. A method, comprising:
receiving an optical signal comprising a signal rising time, and a signal falling time;
converting the optical signal into an electrical signal;
determining the signal rising time and the signal falling time in a combined level and clock recovery circuit;
determining a signal threshold and a clock phase for the electrical signal; and
updating the signal threshold and the clock phase substantially simultaneously by comparing the signal rising time and the signal falling time.

7. The method of claim 6, wherein the signal threshold is updated to match an ideal threshold at an intersection of a signal rising portion and a signal falling portion.

8. The method of claim 6, wherein the clock phase is updated to match an ideal clock time at the intersection of a signal rising portion and a signal falling portion.

9. The method of claim 6, wherein the combined level and clock recovery circuit is a digital circuit.

10. The method of claim 6, further comprising:
performing a coarse level recovery on the optical signal with a level recovery circuit; and
performing, by the combined level and clock recovery circuit, a fine level recovery of the optical signal received from the level recovery circuit.

11. An apparatus, comprising:
an optical receiver configured to receive an optical signal comprising a signal rising time and a signal falling time;
an optical-electrical (O-E) converter coupled to the optical receiver and configured to convert the optical signal into an electrical signal; and
a processor coupled to the O-E converter and configured to:
determine the signal rising time and the signal falling time;
determine a signal threshold and a clock phase for the electrical signal; and
update the signal threshold and the clock phase substantially simultaneously by comparing the signal rising time and the signal falling time.

12. The apparatus of claim 11, wherein the signal threshold is updated to match an ideal threshold at an intersection of a signal rising portion and a signal falling portion.

13. The apparatus of claim 11, wherein the clock phase is updated to match an ideal clock time at the intersection of a signal rising portion and a signal falling portion.

14. The apparatus of claim 11, wherein the combined level and clock recovery circuit is a digital circuit.

15. The apparatus of claim 11, wherein the processor is further configured to:
perform a coarse level recovery on the optical signal; and
perform a fine level recovery of the optical signal after the coarse level recovery has been performed.

* * * * *

UNITED STATES PATENT AND TRADEMARK OFFICE
CERTIFICATE OF CORRECTION

PATENT NO. : 8,538,271 B2
APPLICATION NO. : 12/623722
DATED : September 17, 2013
INVENTOR(S) : Frank J. Effenberger Page 1 of 1

It is certified that error appears in the above-identified patent and that said Letters Patent is hereby corrected as shown below:

Title Page:
Item (60) Related U.S. Application Data: delete "209." and insert -- 2009. --.

Signed and Sealed this
Twenty-second Day of October, 2013

Teresa Stanek Rea
*Deputy Director of the United States Patent and Trademark Office*